United States Patent
Kato et al.

(10) Patent No.: US 9,124,743 B2
(45) Date of Patent: Sep. 1, 2015

(54) IMAGE FORMING APPARATUS

(71) Applicant: CANON KABUSHIKI KAISHA, Tokyo (JP)

(72) Inventors: Hiroshi Kato, Odawara (JP); Hiroki Kato, Gotemba (JP); Daisuke Kaneko, Suntou-gun (JP); Kazushi Ino, Suntou-gun (JP); Ichiro Yasumaru, Mishima (JP); Atsushi Ogata, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/260,851

(22) Filed: Apr. 24, 2014

(65) Prior Publication Data
US 2014/0320873 A1 Oct. 30, 2014

(30) Foreign Application Priority Data
Apr. 25, 2013 (JP) ................................. 2013-092118

(51) Int. Cl.
*G06K 15/00* (2006.01)
*H04N 1/00* (2006.01)

(52) U.S. Cl.
CPC .................................. *H04N 1/00578* (2013.01)

(58) Field of Classification Search
None
See application file for complete search history.

(56) References Cited

U.S. PATENT DOCUMENTS

| | | | | |
|---|---|---|---|---|
| 8,235,385 B2* | 8/2012 | Shimizu | ......................... | 271/225 |
| 8,561,986 B2* | 10/2013 | Kozaki et al. | .................. | 271/274 |
| 8,570,352 B2* | 10/2013 | Miyanagi et al. | ............. | 347/138 |
| 8,588,674 B2* | 11/2013 | Nanayama | ..................... | 399/406 |
| 2011/0187039 A1* | 8/2011 | Ban | ................ | 271/3.17 |
| 2012/0045263 A1* | 2/2012 | Kimura et al. | ................ | 399/361 |
| 2013/0293908 A1* | 11/2013 | Takahashi | ..................... | 358/1.12 |
| 2013/0329241 A1* | 12/2013 | Hirao | ............................ | 358/1.12 |
| 2014/0077443 A1* | 3/2014 | Doyo | ............................ | 271/121 |
| 2014/0294478 A1* | 10/2014 | Osaki et al. | ................... | 399/406 |

FOREIGN PATENT DOCUMENTS

JP 2010-114479 A 5/2010

* cited by examiner

*Primary Examiner* — Satwant Singh
(74) *Attorney, Agent, or Firm* — Canon U.S.A., Inc. IP Division

(57) ABSTRACT

An image forming apparatus includes a sheet feeding unit, an image forming unit, a first conveyance path configured to guide the sheet fed from the sheet feeding unit, a second conveyance path configured to guide the sheet on one surface of which an image has been formed by the image forming unit to the first conveyance path again, a document feeding unit configured to feed a document to the second conveyance path, an image reading unit configured to read the document, a third conveyance path branching off from the second conveyance path and configured to guide the document, a switch back conveyance unit configured to convey the document in the third conveyance path, a fourth conveyance path configured to guide the document conveyed by the switch back conveyance unit, and a document discharge unit configured to discharge the document guided by the fourth conveyance path.

9 Claims, 13 Drawing Sheets

IMAGE FORMING APPARATUS

BACKGROUND

1. Field

Aspects of the present invention generally relate to an image forming apparatus configured to read an image of a document and capable of forming the read image on a sheet.

2. Description of the Related Art

Conventionally, as a multiple-function image forming apparatus capable of realizing both image formation on a sheet and document image reading, there has been known an image forming apparatus equipped with an auto document feeder (hereinafter referred to as the "ADF") capable of flow reading of documents. Generally, in such an image forming apparatus, the ADF configured to perform document image reading processing is arranged in the upper portion of an image forming apparatus main body configured to perform image forming processing on sheets.

Generally, when forming images on both sides of a sheet (hereinafter referred to as "two-sided printing," the image forming apparatus switches back the sheet after the completion of image formation on the first surface, and re-conveys the switched-back sheet to the image forming unit. For this purpose, such an image forming apparatus is equipped with a reverse conveyance path for re-convey the switched-back sheet to the image forming unit.

Here, generally, taking into account the conveyance performance for firm thick paper (a sheet of high rigidity), the reverse conveyance path is partially equipped with a conveyance portion with a large radius of curvature (hereinafter referred to as the "U-turn portion"). The same thing applies to the ADF from the viewpoint of conveyance for thick paper. In this way, the conventional multi-function image forming apparatus is individually provided with two U-turn portions, one for the sheet and the other for the document, resulting in an increase in the size of the apparatus itself.

To solve this problem, there has been proposed an image forming apparatus in which the image reading unit is arranged in the reverse conveyance path for the sheet and in which the document is fed to the reverse conveyance path from the manual sheet feeding unit to convey the document in a direction opposite the sheet conveyance direction, thereby making it possible to execute the image reading process (See Japanese Patent Application Laid-Open No. 2010-114479).

In the image forming apparatus discussed in Japanese Patent Application Laid-Open No. 2010-114479, however, the position where the user sets the document and the position where the document whose image has been read is discharged are positioned apart from each other, resulting in poor usability in terms of the handling of the document.

SUMMARY

An aspect of the present invention is generally directed to an image forming apparatus of high usability.

According to an aspect of the present invention, an image forming apparatus includes a sheet feeding unit configured to feed a sheet, an image forming unit configured to form an image on the sheet, a first conveyance path configured to guide the sheet fed from the sheet feeding unit past the image forming unit, a second conveyance path configured to guide the sheet on one surface of which an image has been formed by the image forming unit to the first conveyance path again, a document feeding unit configured to feed a document to the second conveyance path, an image reading unit configured to read the document fed by the document feeding unit, a third conveyance path branching off from the second conveyance path and configured to guide the document, a switch back conveyance unit configured to switch a conveying direction of the document and convey the document in the third conveyance path, a fourth conveyance path configured to guide the document convey by the switch back conveyance unit, and a document discharge unit configured to discharge the document guided by the fourth conveyance path.

Further features of the present disclosure will become apparent from the following description of exemplary embodiments with reference to the attached drawings.

DESCRIPTION OF THE EMBODIMENTS

Hereinafter, an image forming apparatus according to exemplary embodiments will be described with reference to the drawings. The image forming apparatus according the exemplary embodiments is an image forming apparatus equipped with an image reading apparatus capable of reading image information of a document, such as a copying machine, a printer, a facsimile apparatus, and a multifunction peripheral including these functions. In the following description of the exemplary embodiments, the image forming apparatus consists of an electrophotographic laser beam printer (hereinafter referred to as the "printer").

A printer 1 according to a first exemplary embodiment will be described with reference to FIGS. 1 through 6. First, the general construction of the printer according to the first exemplary embodiment will be schematically described with reference to FIGS. 1 and 2.

Figure 1:
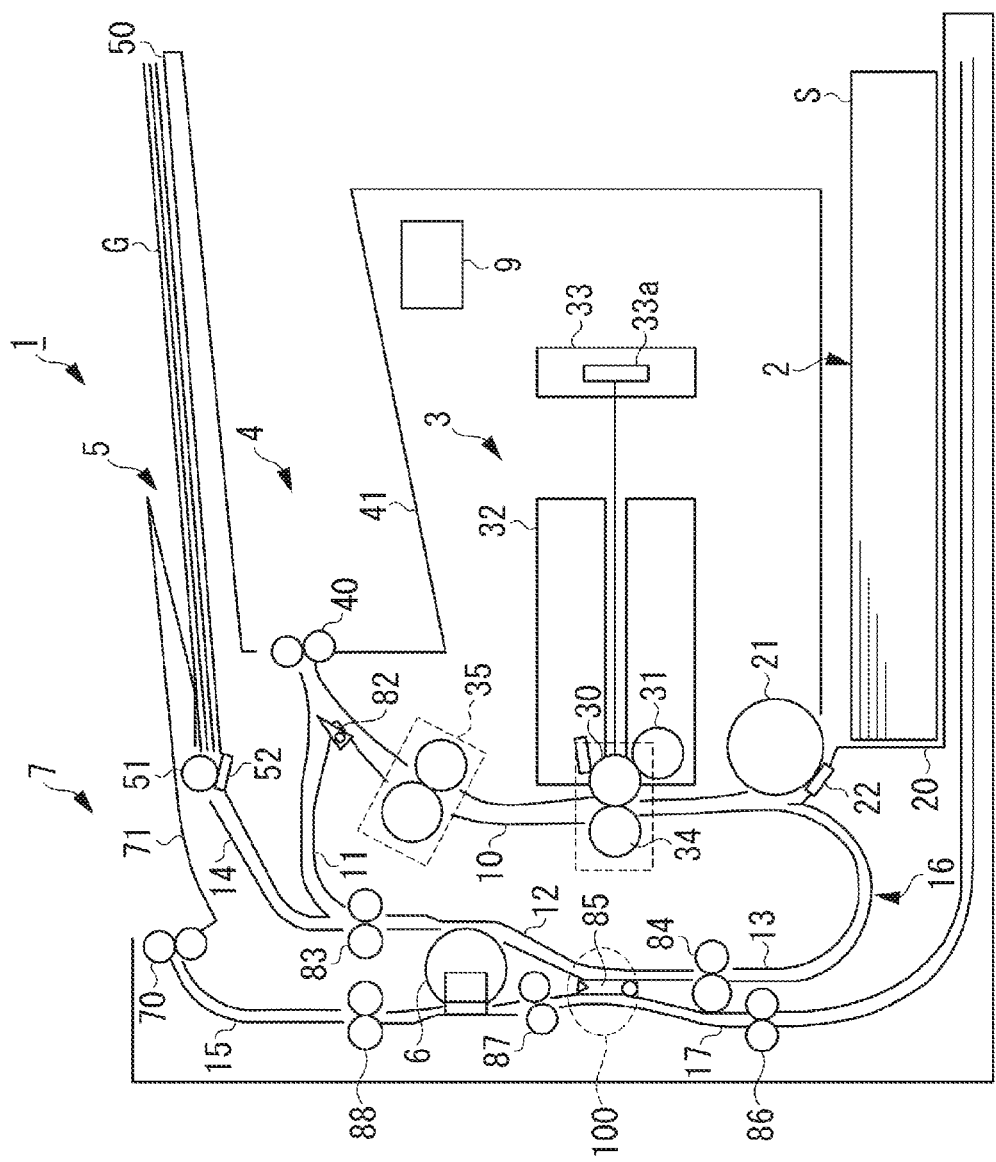
FIG. 1 is a sectional view schematically illustrating a printer according to a first exemplary embodiment.

As illustrated in FIG. 1, the printer 1 is equipped with a sheet feeding unit 2 disposed in the lower portion of the printer 1, an image forming unit 3 disposed above the sheet feeding unit 2, and a sheet discharge unit 4 disposed above the image forming unit 3. Further, the printer 1 is equipped with a document feeding unit 5 disposed above the sheet discharge unit 4, an image reading unit 6 disposed on a side of the printer 1, a document discharge unit 7 disposed above the document feeding unit 5, and a control unit 9 configured to control these components.

Further, the printer 1 is equipped with a sheet conveyance path (first conveyance path) 10 provided between the sheet feeding unit 2 and the sheet discharge unit 4, and a duplex conveyance path (second conveyance path) 16 connecting the downstream side in the conveyance direction and the upstream side in the conveyance direction of the sheet conveyance path 10. The duplex conveyance path 16 is equipped with a reverse conveyance path 11 connected to the downstream side in the conveyance direction of the sheet conveyance path 10, a common conveyance path 12 connected to the downstream end of the reverse conveyance path 11, and a U-turn conveyance path 13 connecting the downstream end of the common conveyance path 12 and the upstream side in the conveyance direction of the sheet conveyance path 10. Further, the printer 1 is equipped with a document feeding path 14 connecting the document feeding unit 5 and the common conveyance path 12, and a reverse conveyance path (third conveyance path) 17 branching off from the downstream end of the common conveyance path 12 and allowing the document G to retract. Further, the printer 1 is equipped with a document discharge path (fourth conveyance path) 15 connecting the reverse conveyance path 17 and the document discharge unit 7 in the vicinity of a branching-off portion 100 between the common conveyance path 12 and the reverse conveyance path 17.

The sheet feeding unit 2 is equipped with a feeding tray 20 on which sheets S are stacked, a feeding roller 21 configured to feed the sheets S stacked on the feeding tray 20, and a separation unit 22 configured to separate the sheets S from each other. The image forming unit 3 is equipped with a process cartridge 32 formed by integrating image forming processing units such as a photosensitive drum 30 and a developing sleeve 31, and an exposure device 33 configured to apply laser light to the photosensitive drum 30 based on image information. Further, the image forming unit 3 is equipped with a transfer roller configured to transfer a toner image formed on the photosensitive drum 30 onto the sheet S, and a fixing unit configured to fix the toner image transferred to the sheet S. The sheet discharge unit 4 is equipped with a sheet discharge reverse roller pair (sheet discharge reverse unit) 40 capable of discharging the sheet on which the image has been formed, and a sheet discharge tray (sheet stacking portion) 41 on which the sheets S discharged to the exterior of the apparatus by the sheet discharge reverse roller pair 40. When forming images on both surfaces of the sheet S, the sheet discharge reverse roller pair 40 reverses the sheet S through reverse rotation before conveying it to the duplex conveyance path 16.

Figure 2:
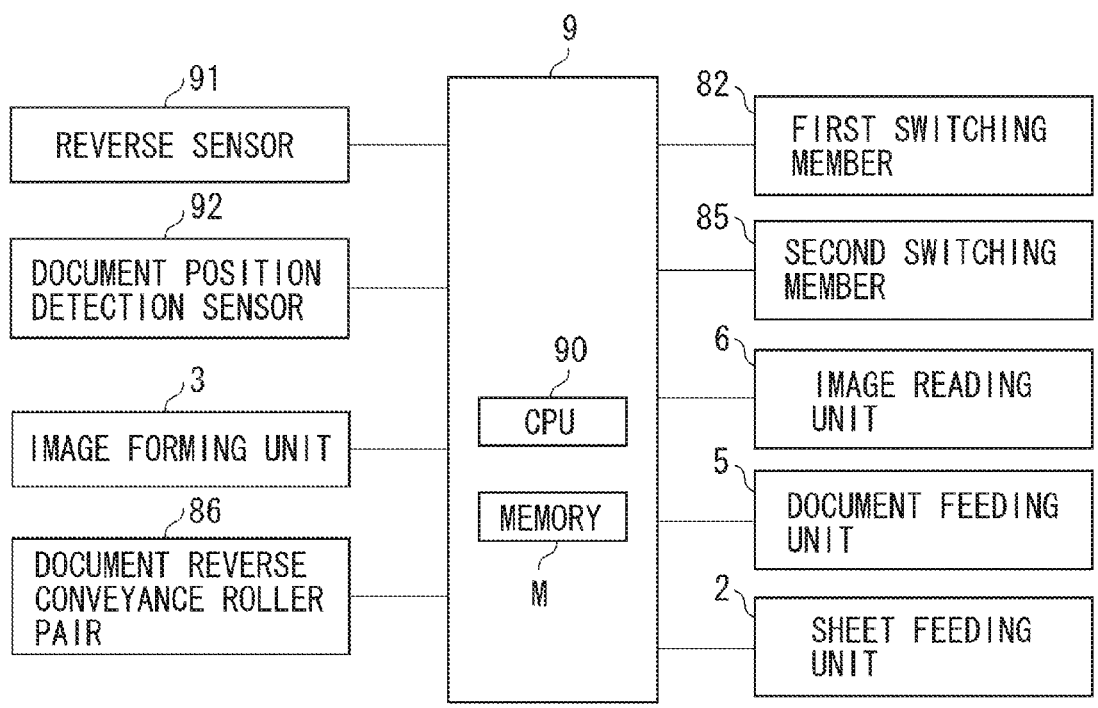
FIG. 2 is a block diagram illustrating a construction of a control unit of the printer according to the first exemplary embodiment.

The document feeding unit 5 is equipped with a document feeding tray 50 (fed document stacking portion) on which the documents G are stacked, a document feeding roller 51 configured to feed the documents G stacked on the document feeding tray 50, and a document separation unit 52 configured to separate the documents G from each other. The image reading unit 6 is provided between the common conveyance path 12 and the document discharge path 15, and is movable, through rotation by 180 degrees, between a first reading position where the image of the document G passing the common conveyance path 12 is read, and a second reading position where the image of the document G passing the document discharge path 15 is read. Apart from the construction in which the image reading unit 6 is rotated, it is also possible to adopt a construction in which there are provided two image reading units of an image reading unit for reading the first surface of the document G and another image reading unit for reading the second surface of the document. The document discharge unit 7 is equipped with a document discharge roller pair (document discharge unit) 70 configured to discharge to the exterior of the apparatus the document G whose image has been read, and a document discharge tray (discharge document stacking portion) 71 on which the documents G discharged to the exterior of the apparatus are stacked. As illustrated in FIG. 2, the control unit 9 is equipped with a central processing unit (CPU) 90 configured to drive-control the sheet feeding unit 2, etc., and memory M for storing various programs and image data of the documents G, etc.

The sheet conveyance path 10 extends upwardly so as to be capable of guiding the sheet S fed from the sheet feeding unit 2 to the sheet discharge tray 41 via a transfer nip and a fixing nip of the image forming unit 3. On the downstream side in the sheet conveyance direction of the sheet conveyance path 10, there is provided the above-mentioned sheet discharge reverse roller pair 40. The reverse conveyance path 11 extends substantially horizontally to the side opposite the sheet discharge tray 41, and a first switching member 82 configured to guide the sheet S is provided at the branching-off portion between the sheet conveyance path 10 and the reverse conveyance path 11. The common conveyance path 12 extends downward, and, on the upstream side in the sheet conveyance direction of the common conveyance path 12, there is provided a first duplex conveyance roller pair 83. The U-turn conveyance path 13 descends, and is then makes a U-turn below before being connected to the sheet conveyance path 10 between the sheet feeding unit 2 and the image forming unit 3. On the upstream side in the conveyance direction of the U-turn conveyance path 13, there is provided a second duplex conveyance roller pair 84.

The reverse conveyance path 17 extends downward substantially parallel to the U-turn conveyance path 13 so as to extend along the U-turn conveyance path 13, and is then bent below the U-turn conveyance path 13 to extend substantially horizontally below the sheet feeding unit 2. The reverse conveyance path 17 is formed so as to be longer than the length in the conveyance direction of the maximum sheet that the printer 1 can process. In the vicinity of the branching-off portion 100 from the common conveyance path 12, there is provided a document reverse conveyance roller pair (switch back conveyance unit) 86 capable of normal and reverse rotation. Further, at the branching-off portion 100 of the common conveyance path 12 and the reverse conveyance path 17, there is provided a second switching member (switch back conveyance unit) 85 capable of guiding the sheet S and the document G to the reverse conveyance path 17 or the U-turn conveyance path 13. The document discharge path 15 extends upwards substantially parallel to the common conveyance path 12 so as to run along the common conveyance path 12, and, on the way of the document discharge path 15, there are provided a first document conveyance roller pair 87 and a second document conveyance roller pair 88. Further, at the downstream end in the conveyance direction of the document discharge path 15, there is provided the above-mentioned document discharge roller pair 70.

Next, the image forming processing (one-side image formation (hereinafter referred to as "one-side printing")) and the two-sided image formation (hereinafter referred to as "two-sided printing") of the printer 1, constructed as described above, will be described. When a printing signal (image forming signal) is received, laser light is applied based on image information from a light emitting portion 33*a* provided in the exposure device 33 to the photosensitive drum 30 the surface of which is charged, whereby an electrostatic latent image is formed on the photosensitive drum 30. And, the electrostatic latent image is developed by toner supplied from a developing sleeve 31, and the image is visualized as a toner image. In parallel with the toner image forming operation, the sheets S are sent out one by one from the sheet feeding unit 2, and are conveyed to the transfer nip at a predetermined timing. When a sheet S reaches the transfer nip, the toner image is transferred to the first surface of the sheet S by an application of bias and pressure, and undergoes fixing at a further downstream fixing nip by being subjected to heat and pressure (See FIG. 3B referred to below). After this, the sheet S to which the toner image has been fixed is discharged to the exterior of the apparatus by the sheet discharge reverse roller pair 40, and is stacked on the sheet discharge tray 41, whereby one-side printing is completed (See FIG. 4A described below).

On the other hand, when performing image formation on both sides of the sheet S (two-sided printing), when the trailing edge of the sheet S passes the branching-off portion of the sheet conveyance path 10 and the reverse conveyance path 11, the sheet discharge reverse roller pair is caused to make reverse rotation, and the first switching member 82 is rotated to switch the conveyance direction of the sheet S. Through the switch back due to the sheet discharge reverse roller pair 40, the sheet S whose first surface has the image formed thereon is guided substantially horizontally through the reverse conveyance path 11 starting with the edge which has been the trailing edge, and enters the common conveyance path 12. The sheet S having entered the common conveyance path 12 is conveyed downwards along the common conveyance path 12 by the first duplex conveyance roller pair 83, and is guided to the U-turn conveyance path 13 by the second switching member 85 (See FIG. 4B referred to below). The sheet S guided to the U-turn conveyance path 13 is caused to make a U-turn along the U-turn conveyance path 13 by the second duplex conveyance roller pair 84, and enters the sheet conveyance path 10. As a result, the sheet S is guided to the image forming unit 3 in a reversed state, and an image is formed on the second surface through the same operation as in the case of image formation on the first surface (See FIG. 5A referred to below). After this, the sheet S both surfaces (the first and second surfaces) of which have undergone image formation is discharged to the exterior of the apparatus by the sheet discharge reverse roller pair 40, and is stacked on the sheet stacking unit 4, whereby two-sided printing is completed (See FIG. 5B described below).

Next, the image reading processing (one-side reading and two-sided reading) by the control unit 9 of the printer 1, constructed as described above, will be described. When reading the images of the documents G, the documents G stacked on the document feeding tray 50 are separated and fed one by one toward the common conveyance path 12, and are conveyed downstream (downward) in the feeding direction of the documents G along the common conveyance path 12 by the first duplex conveyance roller pair 83. At this time, the image reading unit 6 has moved to the first reading position where the first surface of the document G passing through the common conveyance path is read, and the image of the first surface of the document G is read by the image reading unit 6 while the document G is passing through the common conveyance path 12. The read image information is stored in the memory M as the image information on the first surface of the document G.

The document G having passed the image reading unit 6 is guided by the second switching member 85 at the branching-off portion 100 to the reverse conveyance path 17 (See FIG. 3B described below), and is conveyed downwards through the reverse conveyance path 17 by the document reverse conveyance roller pair 86 (See FIG. 4A described below). When the trailing edge of the document G whose image of the first surface has been read passes the second switching member 85, the document reverse conveyance roller pair 86 is caused to make a reverse rotation, and the second switch member 85 is rotated counterclockwise to switch the conveyance direction of the document G to the document discharge path 15. As a result, the document G is switched back toward the document discharge path 15.

When the document is switched back, the image reading unit 6 is rotated by 180 degrees to be moved to the second reading position. As a result, the document G is conveyed through the document discharge path 15 by the first document conveyance roller pair 87, whereby the image of the second surface of the document is read by the image reading unit 6. The read image information is recorded in the memory M as image information about the second surface of the document G. The document G having passed the image reading unit 6 is conveyed upwardly toward the document discharge portion 53 along the document discharge path 15 by the second document conveyance roller pair 88, and is discharged to the document discharge portion 53 by the document discharge roller pair 70 to be stacked on the document discharge portion 53. When the reading of the document G is completed, the image reading unit 6 is rotated by 180 degrees in preparation for the next document, and is moved to the first reading position again. In a case where the user arbitrarily selects one-side reading, it is also possible to perform control so as not to rotate the image reading unit 6.

Here, when the user has selected the copying mode, the above-described image forming processing is executed based on the image information stored in the memory M. In this case, a part of the image reading operation and a part of the image forming operation are executed in an overlapped manner. On the other hand, in a case where the copying mode is not selected, the image information stored in the memory M may be transmitted to an external computer as electronic data.

Next, the operational sequence of the printer 1 by the control unit 9 when executing a plurality of two-sided printing operations and a plurality of two-sided image reading operations in a case where the copying mode is not selected, will be described with reference to FIGS. 3A through 6B in addition to FIGS. 1 and 2. In the present exemplary embodiment described below, though two-sided printing on two sheets and image reading operation on two sheets are performed, a plurality of sheets and documents can also be processed by repeating the following operations.

Figure 3A:
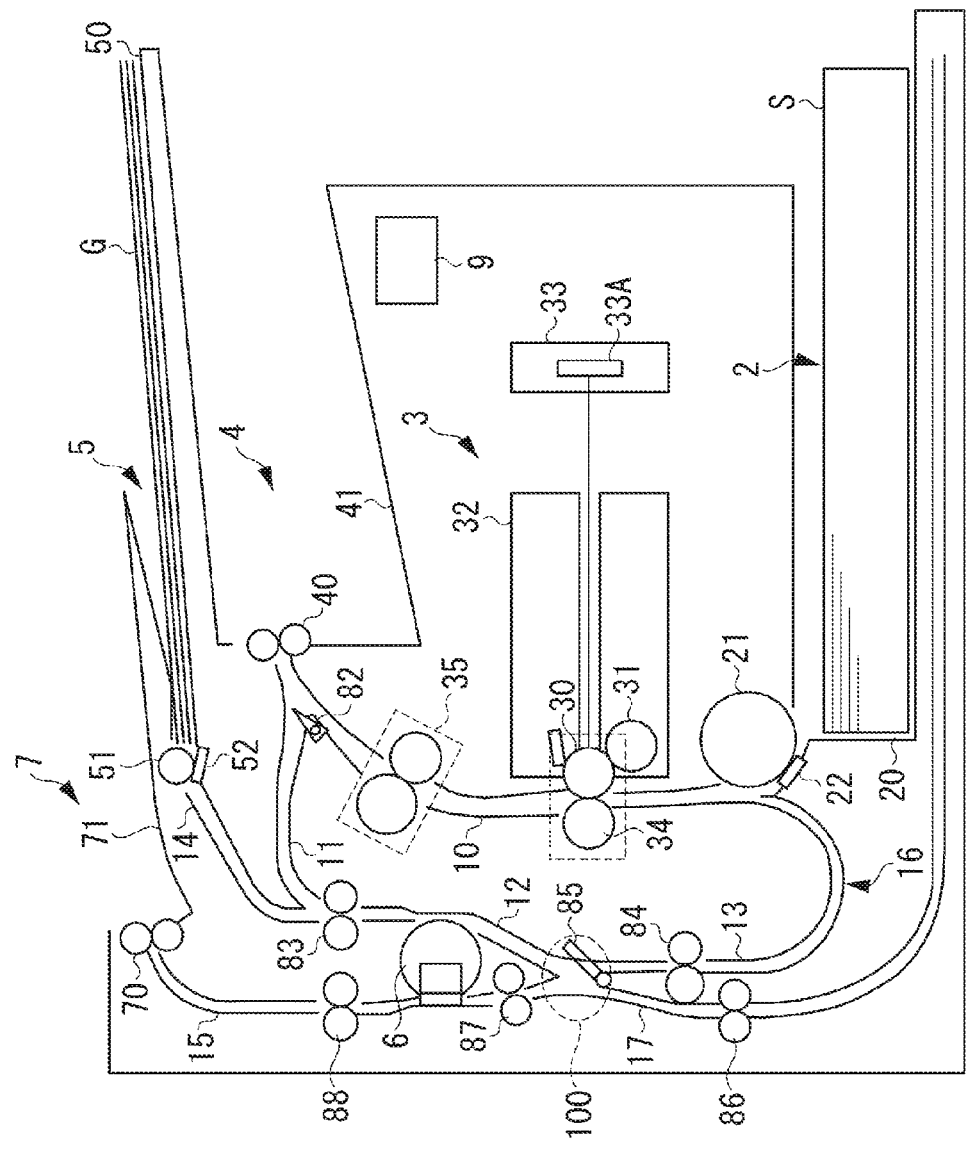
FIGS. 3A and 3B are explanatory views illustrating an image forming operation of the printer according to the first exemplary embodiment.

First, as illustrated in FIG. 3A, the control unit 9 moves the second switching member 85 to the second guide position where the document G can be guided to the reverse conveyance path 17. At this time, the first switching member 82 is on standby at the first guide position where the sheet S can be guided to the sheet discharge tray 41, and the image reading unit 6 is on standby at the first reading position.

Figure 3B:
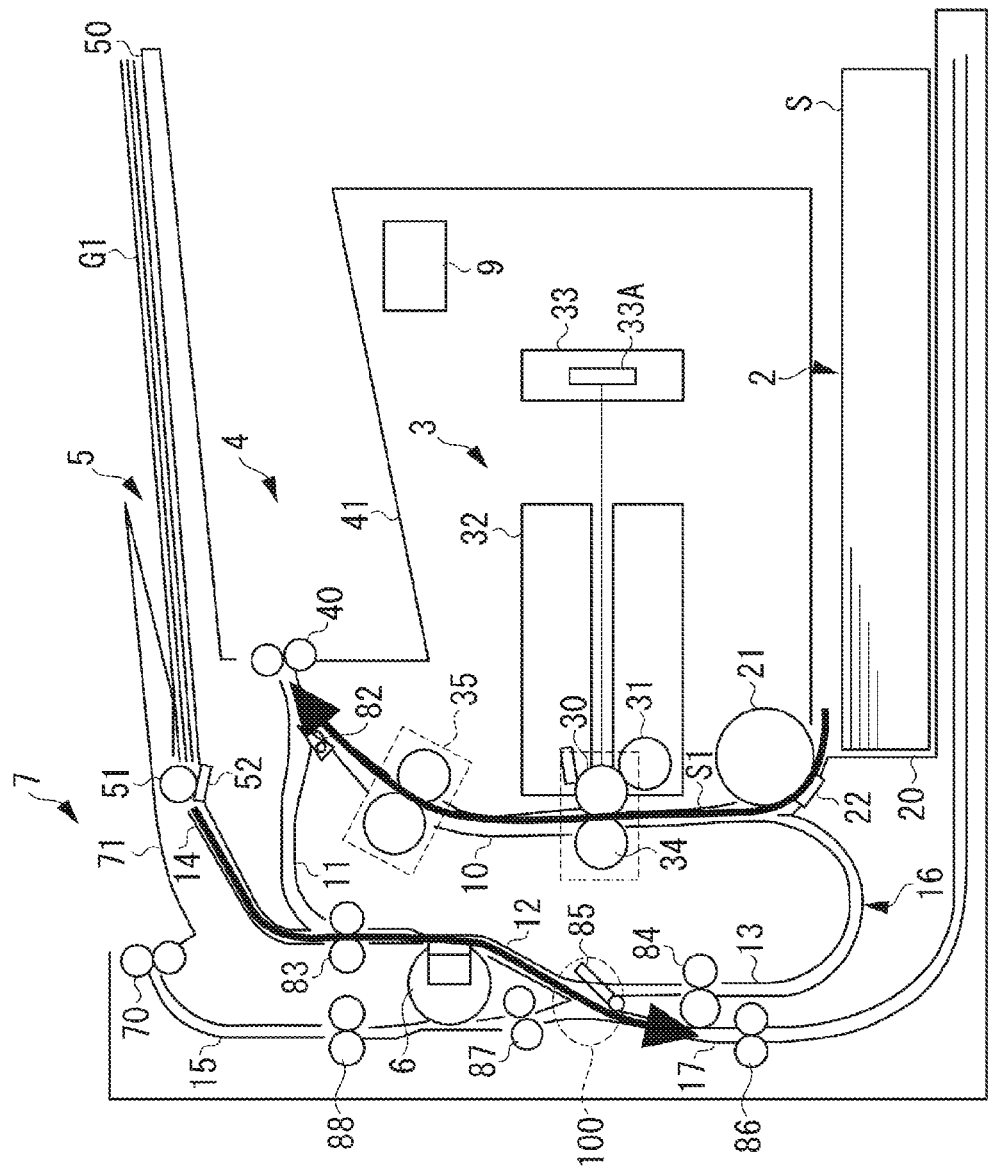

When, in this state, the preceding sheet S1 is fed from the sheet feeding unit 2, an image is formed on the first surface of the preceding sheet S1 by the image forming unit 3. Further, when the preceding document G1 is fed from the document feeding unit 5 in parallel with the operation of feeding the preceding sheet S1, the image of the first surface of the preceding document G1 is read by the image reading unit 6. As illustrated in FIG. 3B, the preceding document G1 whose image of the first surface has been read is guided to the reverse conveyance path 17 by the second switching member 85, and is downward conveyed by the document reverse conveyance roller pair 86.

Figure 4A:
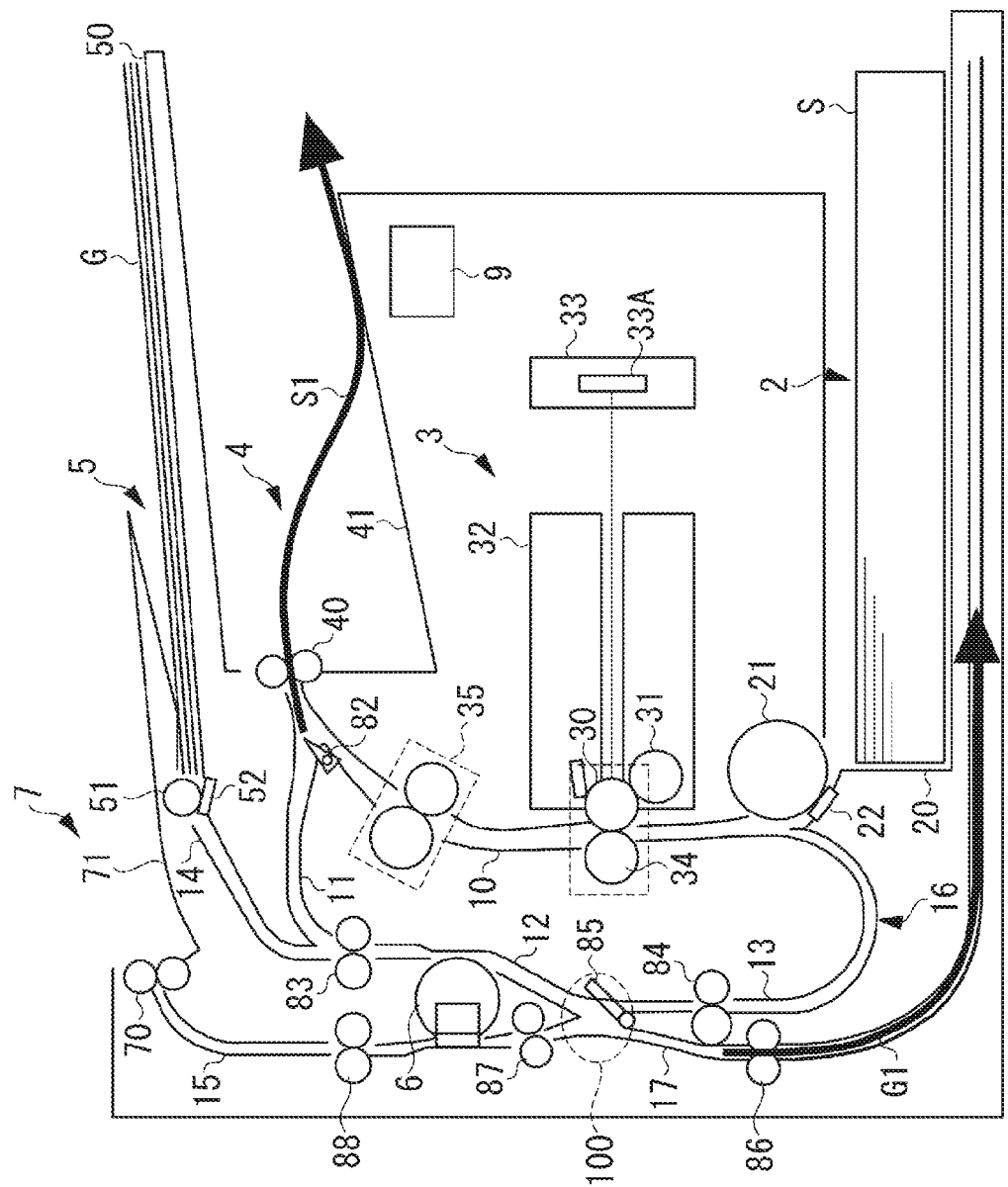
FIGS. 4A and 4B are explanatory views illustrating the image forming operation of the printer according to the first exemplary embodiment.

As illustrated in FIG. 4A, when the reverse sensor 91 (See FIG. 2) detects that the trailing edge of the preceding sheet S1 whose first surface has undergone image formation has passed the first switching member 82, the control unit 9 stops the sheet discharge reverse roller pair 40 in a state in which the trailing edge of the preceding sheet S1 is pinched. Similarly, when the document position detection sensor 92 (See FIG. 2) detects that the trailing edge of the preceding document G1 has passed the second switching member 85, the control unit 9 stops the document reverse conveyance roller pair 86 in a state in which the trailing edge of the preceding document G1 is pinched.

Figure 4B:
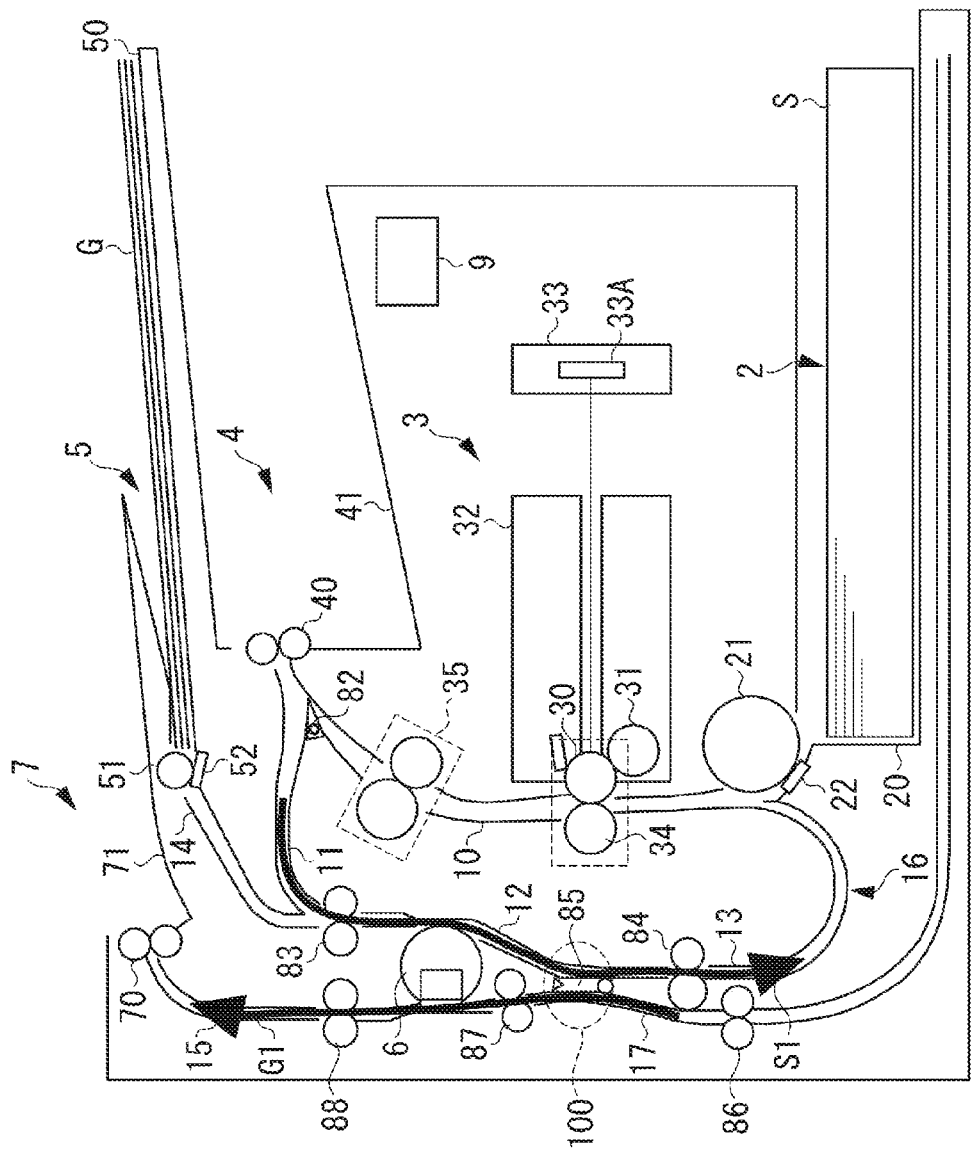

When the sheet discharge reverse roller pair 40 stops, the control unit 9 then moves the first switching member 82 to the second guide position where the sheet S can be guided to the duplex conveyance path 16, and then causes the sheet discharge reverse roller pair 40 to make a reverse rotation. As a result, the preceding sheet S1 is switch-back-conveyed to the duplex conveyance path 16. Similarly, when the document reverse conveyance roller pair stops, the control unit 9 moves the second switching member 85 to the first guide position (See FIG. 1) where the document G can be guided to the document discharge path 15 and the sheet S can be guided to the U-turn conveyance path 13, and then causes the document reverse conveyance roller pair 86 to make a reverse rotation. Further, the control unit 9 rotates the image reading unit 6 by 180 degrees so as to place it at the second reading position. As a result, as illustrated in FIG. 4B, the preceding document G1 is switch-back-conveyed to the document discharge path 15, and when the document is conveyed through the documents discharge path 15 by the first document conveyance roller pair 87, the image of the second surface is read by the image reading unit 6. The preceding sheet S1 is conveyed from the common conveyance path 12 to the U-turn conveyance path 13 due to the movement of the second switching member 85 from the second guide position to the first guide position.

Figure 5A:
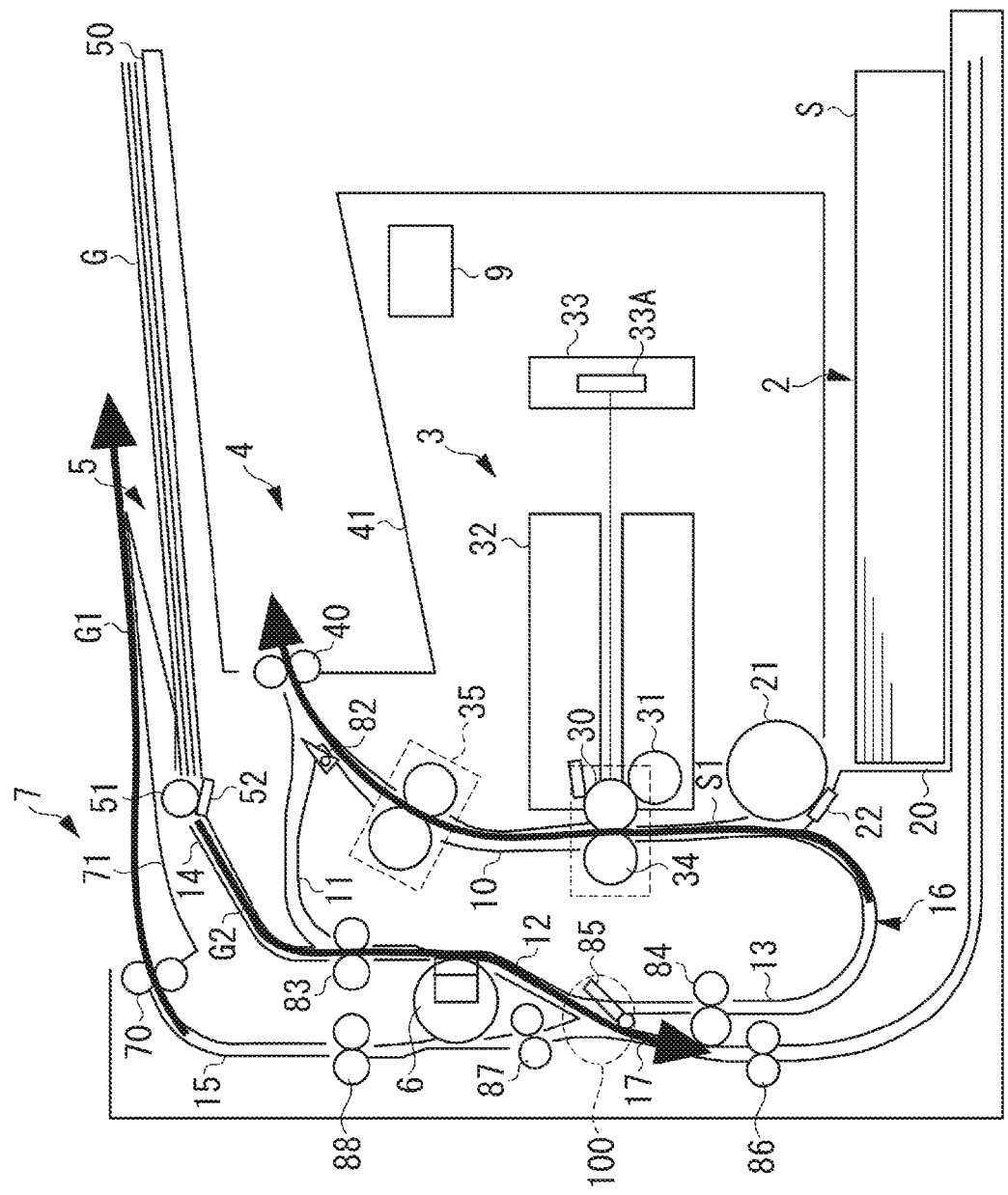
FIGS. 5A and 5B are explanatory views illustrating the image forming operation of the printer according to the first exemplary embodiment.

As illustrated in FIG. 5A, the preceding document G1 whose image of the second surface has been read, is conveyed upwardly by the second document conveyance roller pair 88, and is discharged onto the document discharge tray 71 by the document discharge roller pair 70. At this time, the succeeding document G2 is fed to the common conveyance path 12 from the document feeding unit 5, and the image of the first surface is read at the common conveyance path 12, and the document is conveyed to the reverse conveyance path 17. When the trailing edge of the preceding sheet S1 passes the branching-off portion 100, the control unit 9 has moved the second switching member 85 from the first guide position to the second guide position, whereby the succeeding document G2 can move to the reverse conveyance path 17. As illustrated in FIGS. 5B through 6B, the succeeding document G2 conveyed to the reverse conveyance path 17 is switch-back-conveyed through an operation similar to that for the succeeding document G1, and is the image of the second surface thereof is read, and then the document is discharged onto the document discharge tray 71.

Figure 5B:
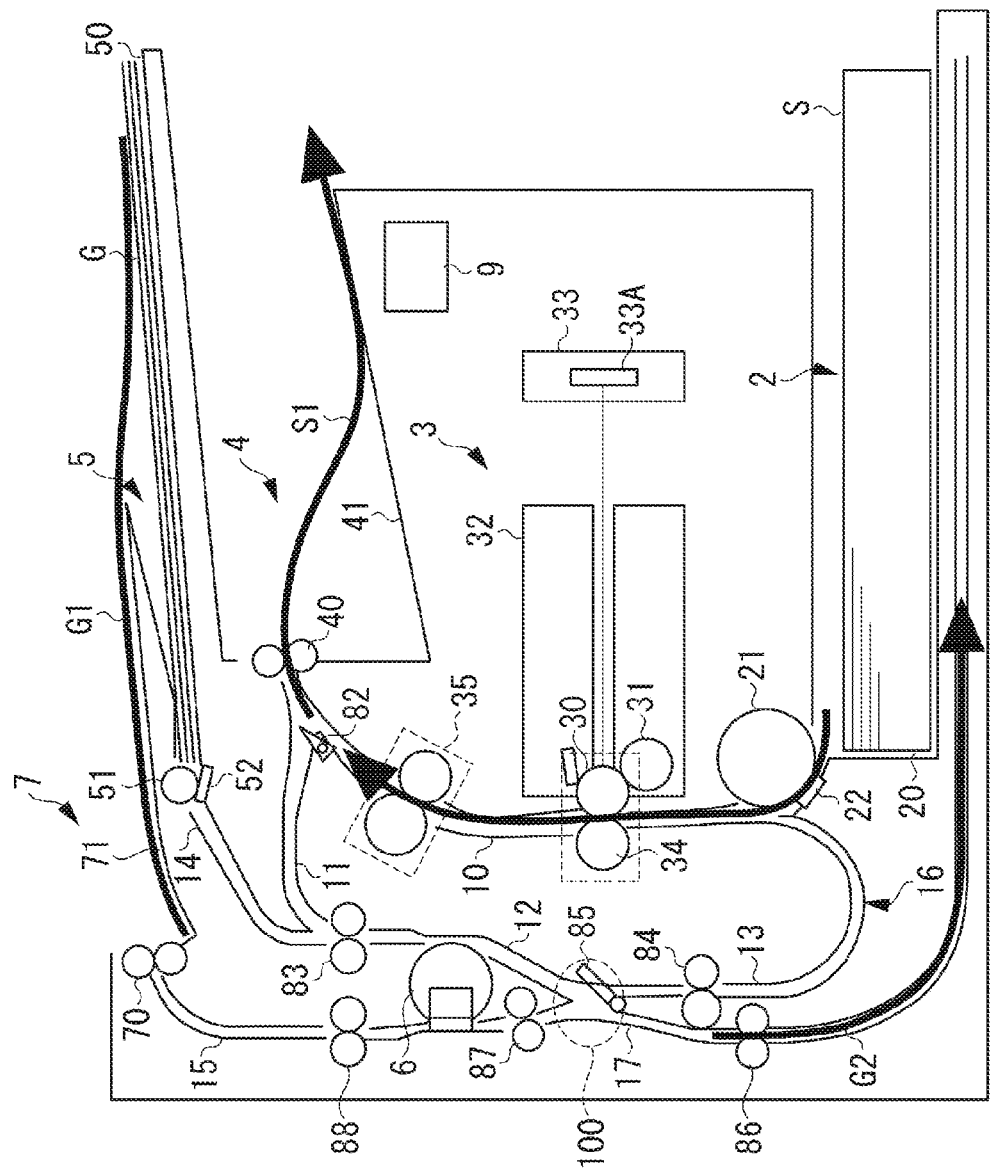
Figure 6A:
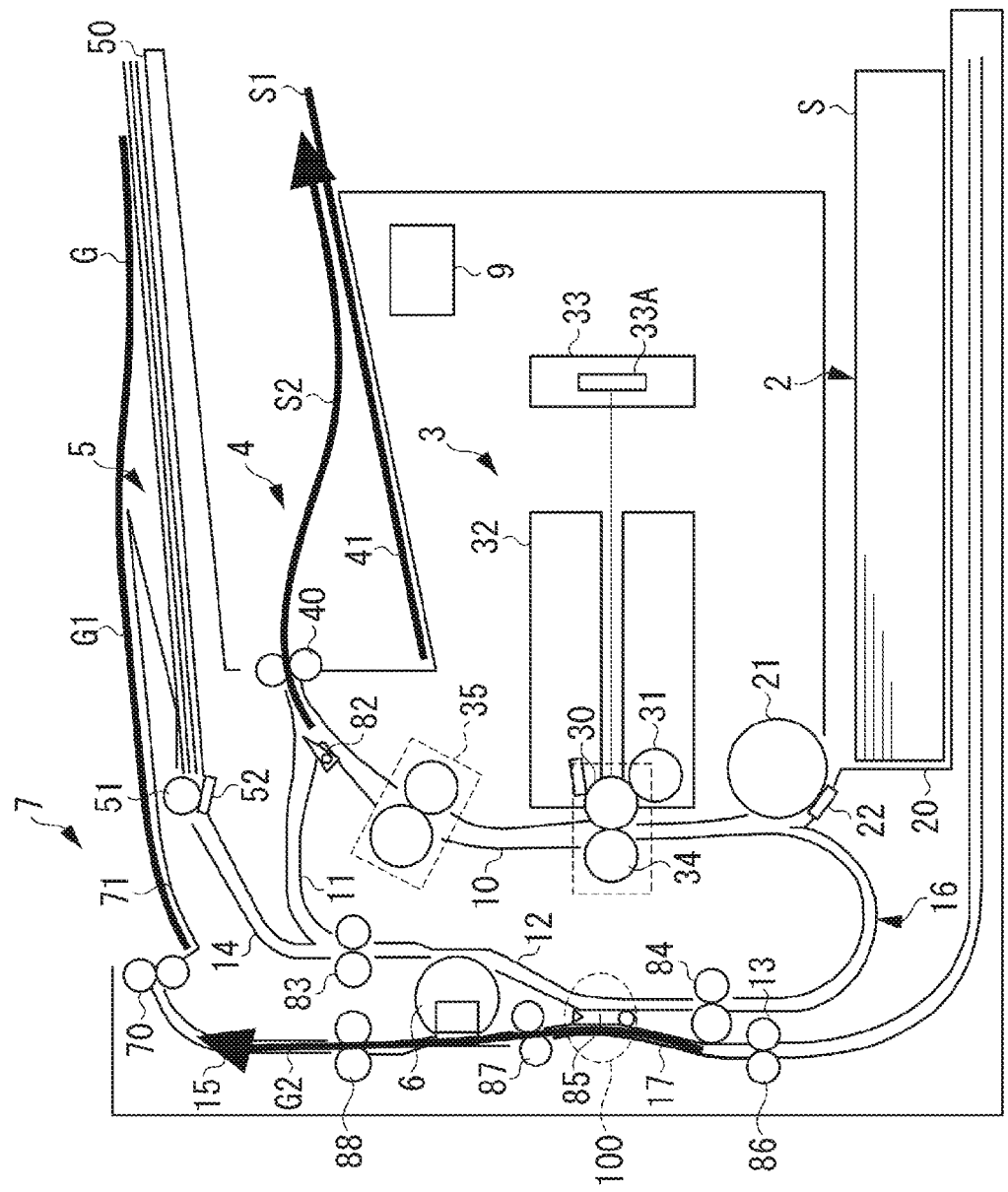
FIGS. 6A and 6B are explanatory views illustrating the image forming operation of the printer according to the first exemplary embodiment.
Figure 6B:
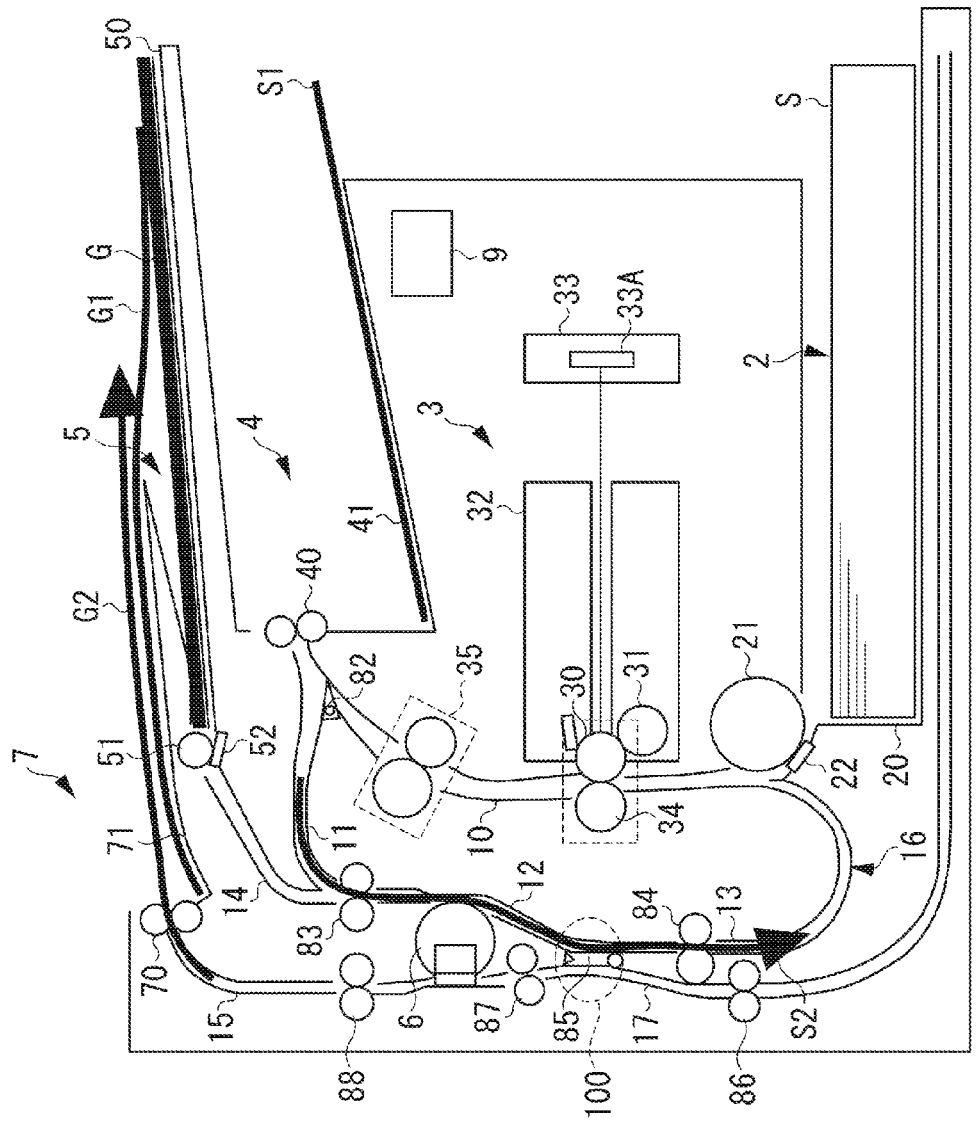

On the other hand, the preceding sheet S1 conveyed to the U-turn conveyance path 13 is conveyed to the sheet conveyance path 10 again by the second duplex conveyance roller pair 84, and an image is formed on the second surface thereof by the image forming unit 3. As illustrated in FIG. 5B, when the trailing edge of the preceding sheet S1 passes the image forming unit 3, the succeeding sheet S2 is fed from the sheet feeding unit 2, and an image is formed on the first surface thereof by the image forming unit 3. After this, as illustrated in FIGS. 6A and 6B, the preceding sheet S1 is discharged onto the sheet discharge tray 41, and an image is formed on the second surface of the succeeding sheet S2 by an operation similar to that for the preceding sheet S1.

As described above, the printer 1 is equipped with the duplex conveyance path 16 where the image reading unit 6 is arranged, the reverse conveyance path 17 branching off from the duplex conveyance path 16 on the downstream side of the image reading unit 6, and the document discharge path 15 connecting the reverse conveyance path 17 and the document discharge tray 71. Further, the printer 1 is equipped with the second switching member 85 configured to switch the conveyance direction of the document G, and the document reverse conveyance roller pair 86 configured to switch back the document G. Thus, when the image is read at the common conveyance path 12, it is possible for the document G to be retracted to the reverse conveyance path 17 without being conveyed through the U-turn conveyance path 13. As a result, the sheet to undergo two-sided printing can be conveyed to the duplex conveyance path 16. As a result, it is possible to suppress a reduction in productivity due to the impossibility of the conveyance of the sheet during the reading of the image of the document. Further, the document feeding unit 5 and the document discharge unit 7 are both provided in the upper portion of the printer 1. Since the document feeding unit 5 and the document discharge unit 7 are located close to each other, it is possible to attain a satisfactory usability in terms of the handling of the document.

Further, the reverse conveyance path 17 is provided so as to run parallel to the U-turn conveyance path 13, and the document discharge path 15 is provided so as to run parallel to the common conveyance path 12. Thus, even in a case in which the reverse conveyance path 17 and the document discharge path 15 are provided, it is possible to suppress an increase in size of the printer 1.

Further, the image reading unit 6 is configured to be movable to the first reading position and the second reading position through rotation by 180 degrees. Thus, when the document G is switched back to the document discharge path 15, it is possible to read the image of the second surface of the document G. Thus, it is possible to perform two-sided reading without increasing the number of image reading units 6, making it possible to suppress an increase in cost.

Next, a printer 1A according to a second exemplary embodiment will be described with reference to FIG. 7. The printer 1A according to the second exemplary embodiment differs from the printer according to the first exemplary embodiment in that the second duplex conveyance path 84 and the document reverse conveyance roller pair 86 are formed by triple downstream rollers one roller of which is shared by both. Thus, regarding the second exemplary embodiment, the description will made centering on the triple downstream rollers 180, and descriptions of the components that are the same as those of the first exemplary embodiment will be left out.

Figure 7:
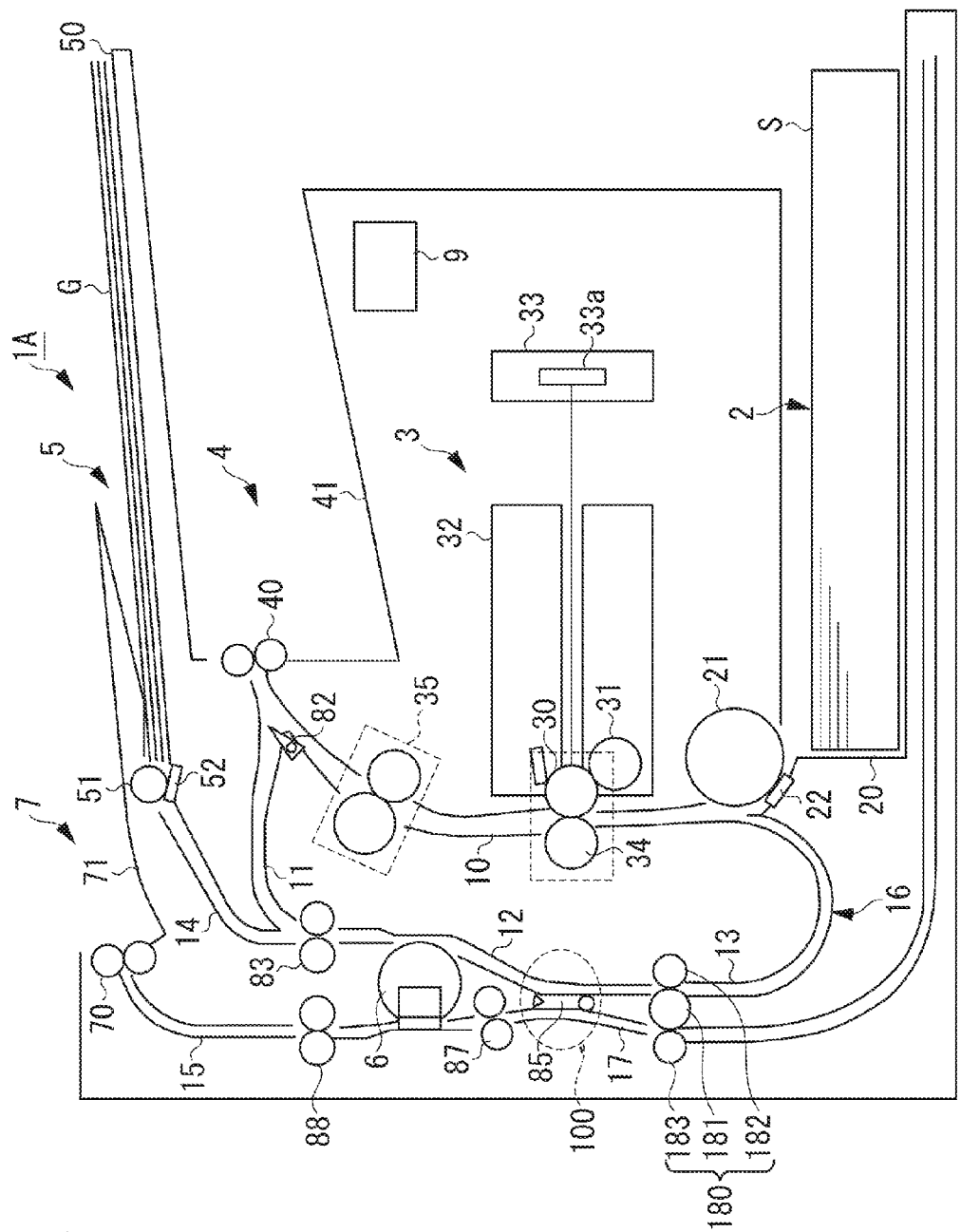
FIG. 7 is a sectional view schematically illustrating a printer according to a second exemplary embodiment.

As illustrated in FIG. 7, the triple downstream rollers 180 are equipped with a conveyance downstream roller 181, a sheet conveyance downstream roller 182, and a document conveyance downstream roller 183. The conveyance downstream roller 181 is arranged between the U-turn conveyance path 13 and the reverse conveyance path 17. The sheet conveyance downstream roller 182 is held in press contact with the conveyance downstream roller 181 from the U-turn conveyance path 13 side, and is configured to convey the sheet S moving through the U-turn conveyance path 13 while pinching it by the nip between the sheet conveyance downstream roller 182 and the conveyance downstream roller 181. The document conveyance downstream roller 183 is held in press contact with the conveyance downstream roller 181 from the reverse conveyance path 17 side, and is configured to convey the document G moving through the reverse conveyance path 17 while pinching it by the nip between the document conveyance downstream roller 183 and the conveyance downstream roller 181.

In the first exemplary embodiment, when performing two-sided printing on the sheet S, the sheet S is conveyed through the duplex conveyance path 16 by the first duplex conveyance roller pair 83 and the second duplex conveyance roller pair 84. When performing image reading on the document G, the document G is conveyed by the first duplex conveyance roller pair 83 and the document reverse conveyance roller pair 86. Thus, the first duplex conveyance roller pair 83 conveys more sheets and documents than the second duplex conveyance roller pair 84 and the document reverse conveyance roller pair 86. As a result, the wear amount of the roller surfaces of the first duplex conveyance roller pair 83 increases to a larger degree than the wear amount of the roller surfaces of the second duplex conveyance roller pair 84 and the document reverse conveyance roller pair 86. As a result, there is a fear of a difference in relative conveyance speed being generated between the first duplex conveyance roller pair 83, and the second duplex conveyance roller pair 84 and the document reverse conveyance roller pair 86.

On the other hand, in the present exemplary embodiment, the second duplex conveyance roller pair 84 and the document reverse conveyance roller pair 86 are formed by the triple downstream rollers 180. Thus, the sheet passing number of the first duplex conveyance roller pair 83 can be equal to that of the triple downstream rollers 180, making it possible for the roller surfaces to be worn to the same degree. As a result, it is possible to suppress generation of a difference in relative conveyance speed between the first duplex conveyance roller pair 83 and the triple downstream rollers 180. As a result, it is possible to maintain a stable accuracy in document reading.

Further, by forming the second duplex conveyance roller pair 84 and the document reverse conveyance roller pair 86 as the triple downstream rollers 180, it is possible to achieve the advantages described above in a simple construction, and to achieve a reduction in printer size.

Next, a printer 1B according to a third exemplary embodiment will be described with reference to FIG. 8. The printer 1B according to the third exemplary embodiment differs from that according to the first exemplary embodiment in that, in addition to the triple downstream rollers described in connection with the second exemplary embodiment, the first duplex conveyance roller pair 83 and the second document conveyance roller pair 88 are formed by triple upstream rollers one of whose rollers is shared by the first duplex conveyance roller pair 83 and the second document conveyance roller pair 88. Thus, regarding the third exemplary embodiment, triple upstream rollers 280 capable of simultaneously conveying the document G and the sheet S will be described, and the components that are the same as those of the first and second exemplary embodiments will be left out.

Figure 8:
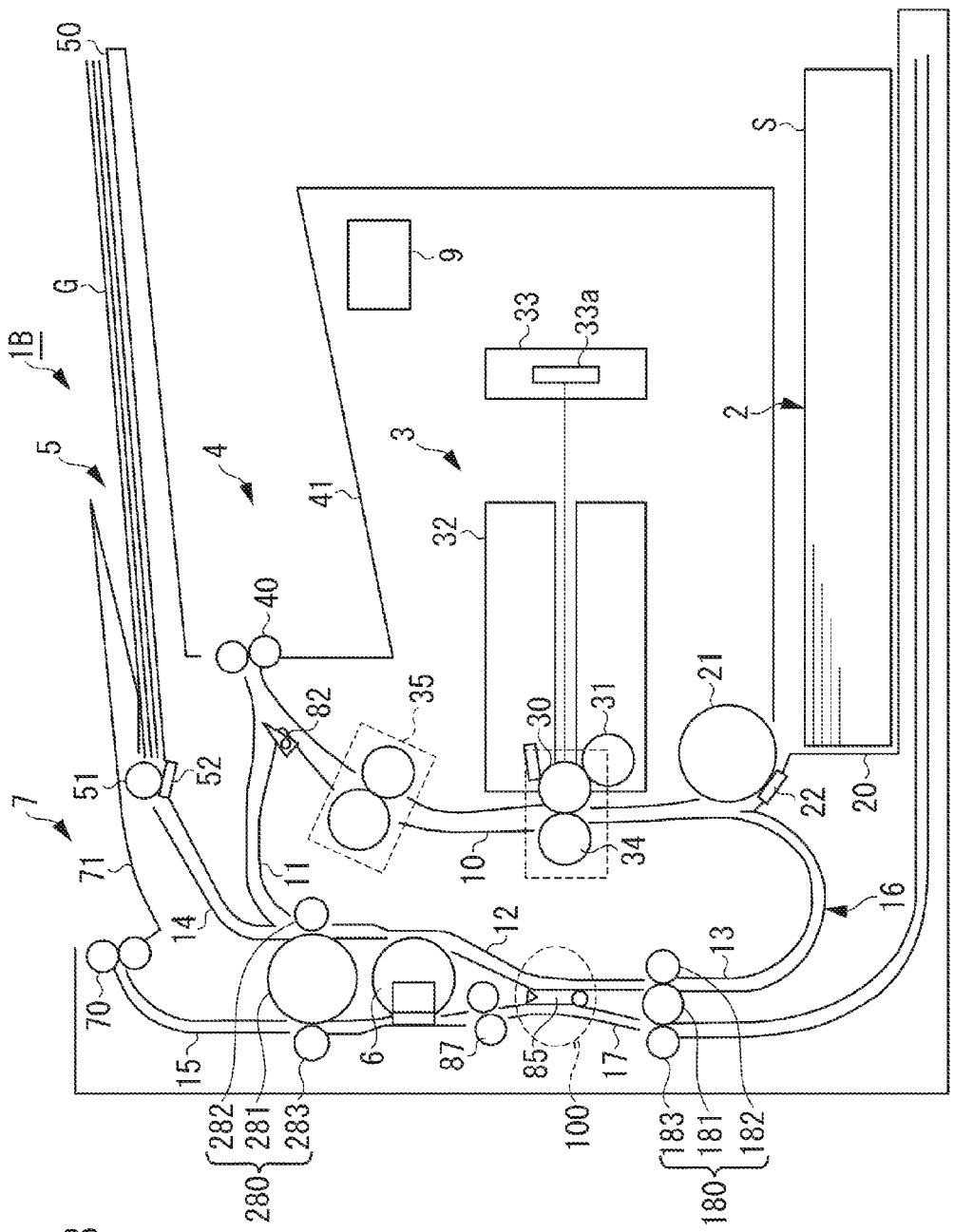
FIG. 8 is a sectional view schematically illustrating a printer according to a third exemplary embodiment.

As illustrated in FIG. 8, the triple upstream rollers 280 are equipped with a conveyance upstream roller 281, a sheet conveyance upstream roller 282, and a document conveyance upstream roller 283. The conveyance upstream roller 281 is arranged between the common conveyance path and the document discharge path 15. The sheet conveyance upstream roller 282 is held in press contact with the conveyance upstream roller 281 from the common conveyance path 12 side, and conveys the sheet S moving through the common conveyance path 12 while pinching it by the nip between the sheet conveyance upstream roller 282 and the conveyance upstream roller 281. The document conveyance upstream roller 283 is held in press contact with the conveyance upstream roller 281 from the document discharge path 15 side, and conveys the document moving through the document discharge path 15 while pinching it by the nip between itself and the conveyance upstream roller 281.

In the second exemplary embodiment, when performing image reading on the document G, the document G is conveyed by the first duplex conveyance roller pair 83 and the triple downstream rollers 180, and then the switched back document G is conveyed by the triple downstream rollers 180 and the second document conveyance roller pair 88. Thus, the triple downstream rollers 180 convey more documents G than the first duplex conveyance roller pair 83 and the second document conveyance roller pair 88. As a result, the wear amount of the roller surfaces of the triple downstream rollers 180 increases to a larger degree than the wear amount of the roller surfaces of the first duplex conveyance roller pair 83 and the second document conveyance roller pair 88. As a result, there is a fear of a difference in relative conveyance speed being generated between the triple downstream rollers 180, and the first duplex conveyance roller pair 83 and the second document conveyance roller pair 88.

On the other hand, in the present exemplary embodiment, the first duplex conveyance roller pair 83 and the second document conveyance roller pair 88 are formed by the triple upstream rollers 280. Thus, the sheet passing number of the triple downstream rollers 180 can be equal to that of the triple upstream rollers 280, making it possible to equalize the degree to which the roller surfaces are worn. As a result, it is possible to suppress generation of a difference in relative conveyance speed between the triple downstream rollers 180 and the triple upstream rollers 280. As a result, it is possible to maintain a stable accuracy in document reading.

Further, by forming the first duplex conveyance roller pair 83 and the second document conveyance roller pair 88 as the triple upstream rollers 280, it is possible to achieve the advantages described above in a simple construction, and to achieve a reduction in printer size.

Figure 9:
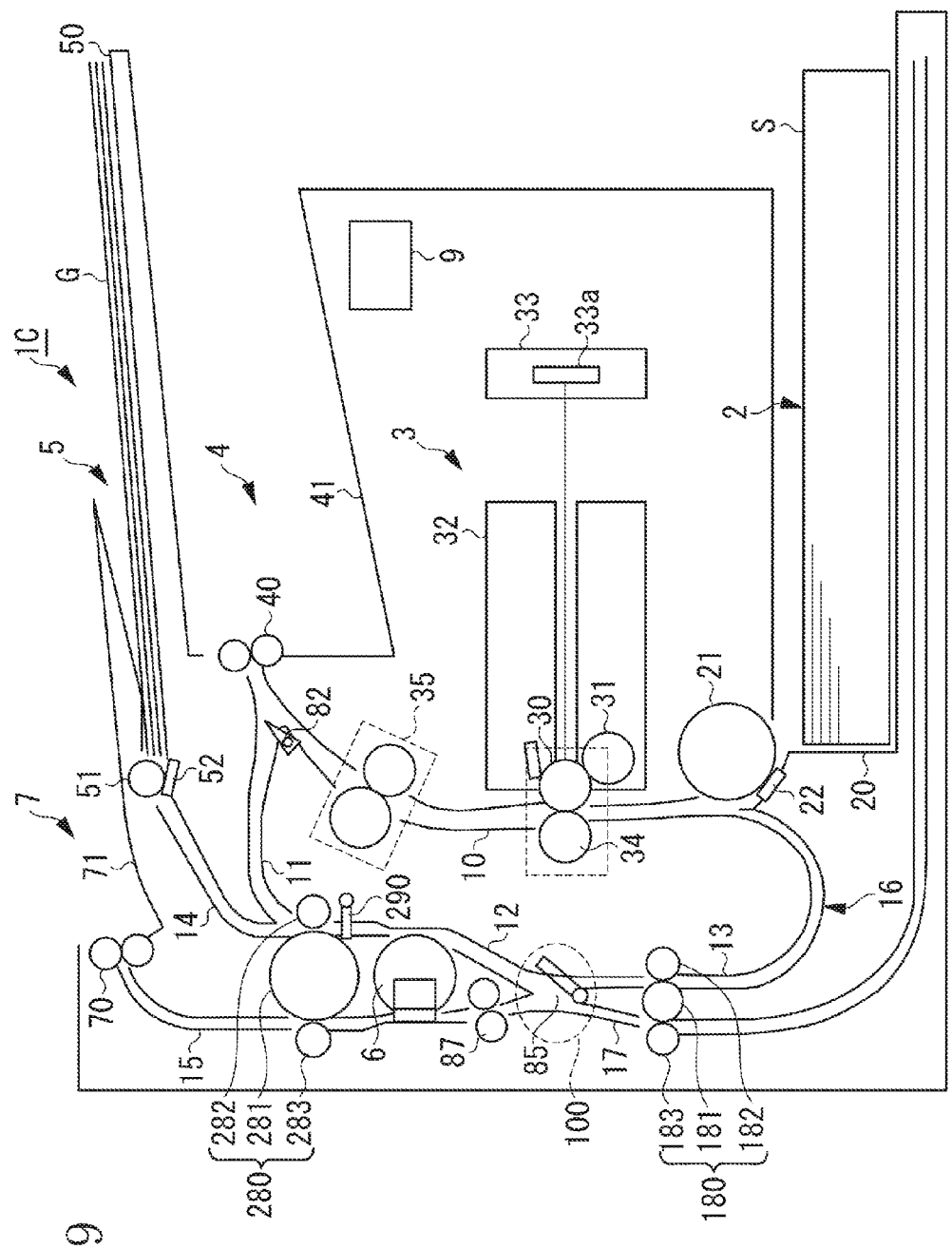
FIG. 9 is a sectional view schematically illustrating a printer according to a fourth exemplary embodiment.

Next, a printer 1C according to a fourth exemplary embodiment will be described with reference to FIG. 9. The printer 1C according to the fourth exemplary embodiment differs from that according to the first exemplary embodiment in that, in addition to the construction of the third exemplary embodiment, a leading edge detection sensor 290 capable of detecting the leading edge of the sheet S is provided in the common conveyance path 12 between the triple upstream rollers 280 and the image reading unit 6. Thus, regarding the fourth exemplary embodiment, the leading edge detection sensor 290 will be described, and the components that are the same as those of the first through third exemplary embodiments will be left out.

The distance between the leading edge detection sensor 290 and the image reading unit 6 is constant independently of the wear of the triple upstream rollers 280, so that, by measuring the passing time of the document G from the leading edge detection sensor 290 to the image reading unit 6, it is possible to calculate the conveyance speed of the document G. Further, by calculating the conveyance speed of the document G, it is possible to analyze the wear amount of the triple upstream rollers 280, and, by analyzing the wear amount, it is possible to change the reading timing at the image reading unit 6. As a result, it is possible to predict a change in overall magnification in image reading processing and to achieve an improvement therein.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-092118, filed Apr. 25, 2013, which is hereby incorporated by reference herein in its entirety.

What is claimed is:

1. An image forming apparatus comprising:
a sheet feeding unit configured to feed a sheet;
an image forming unit configured to form an image on the sheet;
a first conveyance path configured to guide the sheet fed from the sheet feeding unit past the image forming unit;
a second conveyance path configured to guide the sheet on one surface of which an image has been formed by the image forming unit to the first conveyance path again;
a document feeding unit configured to feed a document to the second conveyance path;
an image reading unit configured to read the document fed by the document feeding unit;
a third conveyance path branching off from the second conveyance path and configured to guide the document;
a switch back conveyance unit configured to switch a conveying direction of the document and convey the document in the third conveyance path;
a fourth conveyance path configured to guide the document conveyed by the switch back conveyance unit; and
a document discharge unit configured to discharge the document guided by the fourth conveyance path.

2. The image forming apparatus according to claim 1, wherein the document feeding unit and the document discharge unit are provided above the second conveyance path,
wherein the third conveyance path extends along the second conveyance path to guide the document downward, and
wherein the fourth conveyance path extends along the second conveyance path to guide the document toward the document discharge unit.

3. The image forming apparatus according to claim 1, wherein the fourth conveyance path is connected to a branching-off portion between the second conveyance path and the third conveyance path, and guides the document conveyed by the switch back conveyance unit in the third conveyance path to the document discharge unit.

4. The image forming apparatus according to claim 1, wherein the image reading unit is provided between the second conveyance path and the fourth conveyance path, and is configured to be movable to a first reading position where a first surface of the document moving through the second conveyance path is read and to a second reading position where a second surface of the document moving through the fourth conveyance path is read.

5. The image forming apparatus according to claim 1, further comprising triple downstream rollers including a conveyance downstream roller capable of normal and reverse rotation provided between the second conveyance path and the third conveyance path, a sheet conveyance downstream roller capable of conveying the sheet moving through the second conveyance path by a nip between the sheet conveyance downstream roller and the conveyance downstream roller, and a document conveyance downstream roller capable of conveying the document moving through the third conveyance path by a nip between the document conveyance downstream roller and the conveyance downstream roller, the conveyance downstream roll and the document conveyance downstream roller configuring the switch back conveyance unit,
wherein the triple downstream rollers are configured to simultaneously convey the document moving upward toward the document discharge unit, and the sheet moving downward along the second conveyance path.

6. The image forming apparatus according to claim 5, wherein a conveyance roller is provided between the reading position where the image reading unit reads the image of the document moving through the fourth conveyance path, and the nip between the conveyance downstream roller and the document conveyance downstream roller.

7. The image forming apparatus according to claim 1, further comprising triple upstream rollers including a conveyance upstream roller provided between the second conveyance path and the fourth conveyance path, a sheet conveyance upstream roller capable of conveying the sheet and the document moving through the second conveyance path by a nip between the sheet conveyance upstream roller and the conveyance upstream roller, and a document conveyance downstream roller capable of conveying the document moving through the fourth conveyance path by a nip between the document conveyance downstream roller and the conveyance upstream roller,
wherein the triple upstream rollers are configured to simultaneously convey the document moving upward toward the document discharge unit, and the sheet moving downward along the second conveyance path.

8. The image forming apparatus according to claim 7, further comprising a leading edge detection sensor provided in the second conveyance path between the triple upstream rollers and the image reading unit, and configured to detect the leading edge of the sheet or of the document moving through the second conveyance path.

9. The image forming apparatus according to claim 1,
wherein the first conveyance path guides the sheet upward,
wherein the second conveyance path guides the sheet into the first conveyance path after guiding the sheet downward, and
wherein the document from which the image of the first surface thereof has been read by the image reading unit while being conveyed downward in the second conveyance path, the image of the second surface of the document is read while being conveyed upward in the fourth conveyance path.

* * * * *